Oct. 3, 1950    W. J. WILLENBORG    2,524,244
TEMPERATURE CONTROLLING APPARATUS
Filed March 10, 1948
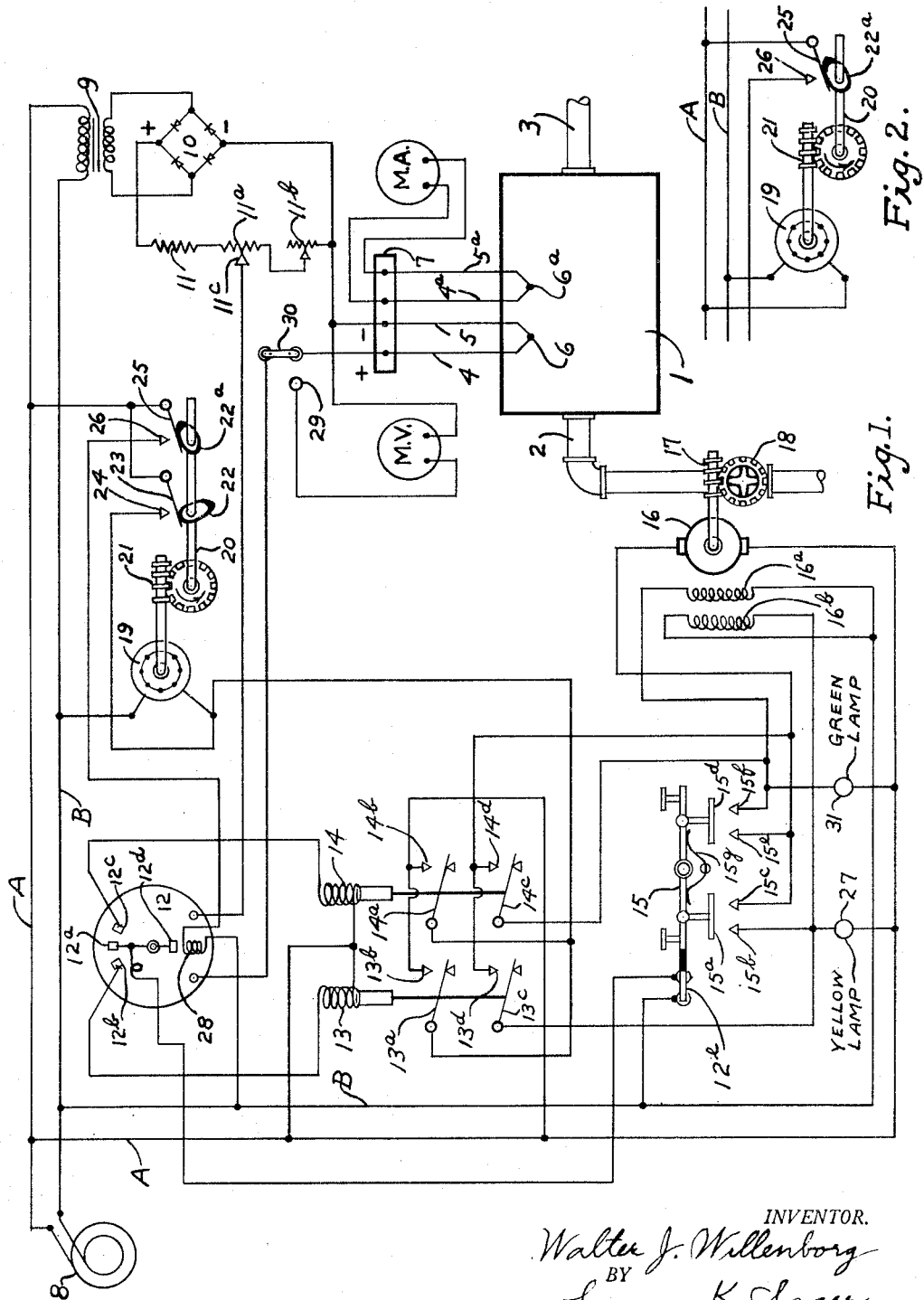
INVENTOR.
Walter J. Willenborg
BY
Lawrence K. Sager
his attorney Patented Oct. 3, 1950

2,524,244

UNITED STATES PATENT OFFICE 2,524,244

TEMPERATURE CONTROLLING APPARATUS

Walter J. Willenborg, Weehawken, N. J., assignor to Jabez Burns & Sons, Inc., New York, N. Y., a corporation of New York Application March 10, 1948, Serial No. 14,077

1 Claim. (Cl. 236—69)

This improvement relates to the regulation and automatic control of the temperature at any selected location whereby the temperature may be maintained at a desired amount within close limits. It is particularly applicable to the control of temperatures in ovens, furnaces, roasters, driers, chemical processes and the like where it is desired to maintain an approximately constant temperature for securing the desired results.

The invention is applicable likewise to temperature control of liquid baths of various substances or compositions and of enclosures containing gases or vapors of various kinds. The desired controlled temperature may be above ambient temperatures and require the control of a heating medium, or may be below ambient temperatures and in that case require the control of a cooling medium for maintaining the controlled region or substance at an approximately constant temperature. The controlled heating or cooling means may be of any character suitable for the particular installation.

The invention is based upon the use of one or more thermo-electric couples, the hot junction or junctions of which are located in the region where the temperature is to be maintained constant. The electromotive force of the thermoelectric couple or couples varies according to the temperature to which they are subjected and this electromotive force is applied in opposition to a substantially constant electromotive force. Any change in the electromotive force of the thermo-couple at the selected location above or below the opposing constant electromotive force is utilized to actuate controlled devices for automatically restoring the temperature at the selected location to the desired temperature. The desired temperature is thus maintained constant within close limits due to the responsive means being sensitive to slight changes in temperature.

One object is to provide apparatus which is comparatively simple in the type of responsive means and which is dependable and positive in its action under long continued use. Another object is to maintain a temperature at the selected location within quite close limits. Another object is to provide adjustable means of a simple character for selecting the desired temperature which is to be maintained constant at the desired location. Another object is to provide means of a simple character for indicating the temperature at the controlled location where the temperature is to be maintained constant. Another object is to avoid the use of electronic tubes and devices which have a comparatively short life, especially when subjected to vibration. These and other objects will be understood from the following description and accompanying drawing which illustrate preferred embodiments of the invention.

Fig. 1 is a diagram showing the responsive means and controlled apparatus in its application to a general form of temperature controlled enclosure; and Fig. 2 is a modification of a portion of the apparatus of Fig. 1.

A casing 1 is indicated in a general way and this may be an oven, roaster, furnace, or any enclosure where the temperature is to be maintained constant. A supply pipe 2 thereto is indicated which may supply gas or oil fuel to the enclosure, or may be any means for varying the temperature of the enclosure by regulating the supply. The enclosure is shown provided with an outlet 3 which may lead to a stack or to a recirculating system and the like, according to the character of the type of apparatus to which this improvement is applied. A thermo-electric couple having the wires 4 and 5 is shown extending within the enclosure 1, the junction 6 of this couple being located at the region where the temperature is to be maintained constant. The wires 4, 5 may be of any suitable dissimilar metals for forming the thermo-electric couple such as bismuth and antimony and good results have been obtained by using Chromel and Alumel. The outside cold terminals of the thermo-couple are mounted upon a support 7 where they are maintained at a substantially uniform temperature. A similar thermo-couple having the wires 4a and 5a and junction 6a, is located close to the first described thermo-couple and has its cold terminals mounted upon the same support 7. The terminals of the couple 4a, 5a are connected to a milliammeter MA. The scale of this meter is calibrated in degrees of temperature for indicating the temperature within the enclosure 1, as the current supplied to this meter from the thermo-couple is responsive to the temperature within the enclosure. It thus shows at all times the temperature within the enclosure and any slight variations from the desired temperature.

The electromotive force generated by the couple 4, 5 is utilized to oppose a substantially constant electromotive force and when the electromotive force of this couple is equal to that of the constant electromotive force, no responsive effect takes place; but a rise or fall of the electromotive force of the couple as determined by any change in temperature within the enclosure 1 will result in the responsive means functioning to restore the temperature to the normal value.

A source 8 of alternating current is indicated in the upper left-hand corner of Fig. 1 as supplying the lines A and B. These lines supply a transformer 9 for reducing the voltage from that of an assumed 110 volt circuit to a lower value. The secondary of the transformer is connected to a full-wave rectifier 10 indicated of the copper oxide type. The output circuit of this rectifier includes in series a resistor 11 having a high resistance, such as 30,000 ohms, an adjustable resistor 11a of say about 100 ohms and an additional adjustable resistor 11b of say about 2 ohms, the adjustable resistors being for the purpose of obtaining refined adjustment of the voltage which opposes the voltage of the couple 4, 5. The adjustable contact 11c of the resistor 11a is connected to one terminal of a contact galvanometer 12, the other terminal of which is connected to the thermo-couple wire 4, the other wire 5 being connected to the negative terminal of the rectifier 10. It is thus apparent that the electromotive force of the thermo-couple 4, 5 is opposed to that portion of the electromotive force of the rectifier which exists between its negative terminal and the contact 11c, the responsive coil of the galvanometer 12 being included in the circuit of these opposed voltages. When the voltage of the thermo-couple is greater than its opposing voltage, the contact galvanometer will move its movable contact 12a, say to the left, and engage a fixed contact 12b. When the voltage of the thermo-couple is less than its opposed voltage, the movable contact of the galvanometer will move, say to the right, and engage the fixed contact 12c.

The vane of the contact galvanometer which carries the movable contact 12a is electrically connected to the supply line B through a switch 12e; the fixed contact 12b of the galvanometer is connected to one terminal of a relay having a winding 13, the other terminal of which is connected to the supply line A. This relay has a movable contact 13a which when the relay is energized engages a fixed contact 13b; and also has a movable contact 13c which when the relay is energized engages the fixed contact 13d. The fixed contact 12c of the galvanometer is connected to one terminal of a relay having a winding 14, the other terminal of which is connected to the line A. This relay has a movable contact 14a which when the relay is energized engages a fixed contact 14b. It also has a movable contact 14c which when the relay is energized engages a fixed contact 14d. The connections of the parts will be understood from a later description of the mode of operation.

A manually operated switch comprises a lever 15 pivoted at its center and carries a movable contact 15a which when depressed engages a pair of contacts 15b and 15c. It also carries at the other side of the pivot a contact 15d which when depressed engages the fixed contacts 15e and 15f. A double arm leaf spring 15g tends to hold the lever 15 in its neutral position. One end of the lever also carries the movable element of the switch 12e.

A series commutator type motor is shown in the lower central portion of Fig. 1 having an armature 16 and two field windings 16a and 16b, these two field windings being for the purpose of reversing the direction of rotation of the motor. The motor drives a reduction gear which is indicated as a worm 17 driving a gear wheel 18 which operates a valve in the supply pipe 2 for increasing or decreasing the temperature in the enclosure 1, according to the direction in which the gear 18 is turned. This valve may control a fuel supply or other form of supply for regulating the temperature within the enclosure.

In the upper central part of Fig. 1 is shown a timing device indicated as being driven by an induction motor 19 which, through a gear reduction, drives a shaft 20, the gear reduction being indicated as a worm 21 driven by the motor engaging a gear on the shaft 20. This shaft has fixed thereto a pair of cams 22 and 22a, indicated as having peripheries of insulating material. The cam 22 actuates a movable contact 23 to engage a fixed contact 24. The cam 22a actuates a movable contact 25 to engage a fixed contact 26. The cams 22 and 22a are set in such relation to each other that when the motor 19 starts and drives the shaft 20, the cam 22a will, after a short interval, cause the contact 25 to engage the contact 26. After a short interval of this engagement, the cam 22 will cause its contact 23 to engage the fixed contact 24 and cause the motor to continue its operation for a short interval sufficiently long to cause the cam 22a to permit the disengagement of its contact 25 with the contact 26. As already stated, the connections of the parts will be understood from the following description of operation.

The drawing shows the parts under the condition when the temperature in the enclosure 1 is of the normal desired value. Now assume that the temperature increases slightly above a normal value which will cause the thermo-couple 4, 5 to generate a slightly increased electromotive force and then exceed its opposing electromotive force on that portion of the output circuit of the rectifier 10 included between the contact 11c and the negative terminal of the rectifier. A current is then caused to pass from the positive terminal of the thermo-couple through the winding of the galvanometer to the contact 11c. The vane of the galvanometer will then move its contact 12a into engagement with the fixed contact 12b. This causes a current to pass from the line A through the relay winding 13, contact 12b, contact 12a and then through switch 12e to the line B. This energization of the winding of the relay causes its movable contacts to engage its fixed contacts. This results in actuating the motor 16 in a direction to turn the valve wheel 18 to reduce the temperature within the enclosure 1 by a circuit through the motor as follows: from line A through the armature 16 to the contact 13d of the relay 13, contact 13c, field winding 16b, for causing the motor to operate in the desired direction and then to the line B. The closing of this circuit also energizes a lamp bulb 27 which is connected across the armature 16 from the line A to a connection between the armature 16 and the field winding 16b. This lamp bulb may be yellow for indicating that the apparatus is operating to reduce the temperature of the enclosure 1.

At the same time the motor 16 is started, the motor 19 is also started by a circuit from the line B through the motor to the contact 13a of the relay 13, contact 13b and then to the line A. The starting of the motor 19 turns the shaft 20 and after a short interval the cam 22a will cause its contact 25 to engage the fixed contact 26 and thereby energize a reset winding 28 on the galvanometer by a circuit from the line A through contacts 25 and 26 then through the reset winding 28 to line B. This reset electromagnetic device may be of any suitable form, but is shown as attracting an armature 12d on the vane of the galvanometer from its displaced position to its central position. This, of course, deenergizes the relay winding 13 and stops the motor 16, but the motor 19 continues to operate because the cam 22 has in the meantime caused the contact 23 to engage the contact 24 and thereby maintain the circuit to the motor 19 by a connection from line B through the motor to contacts 24 and 23 and then to line A. In the meantime the contact 25 is maintained in engagement with its contact 26 to continue the excitation of the reset winding 28 a short interval after which the contact 25 disengages the contact 26 and then the motor 19 continues to operate a short time until the cam 22 permits its contact 23 to disengage the contact 24 and then cause the motor 19 to stop. However, if the control of the valve 18 has not been sufficient to reduce the temperature within the enclosure 1 to normal, the contact 12a will again engage the contact 12b as soon as the contact 25 disengages the contact 26 and the above described operation will be repeated and the cycle again passed through and so on until the normal temperature within the enclose 1 is restored.

Now assume that the temperature within the enclosure 1 falls slightly below normal. This will result in the electromotive force of the couple 4, 5 being less than its opposing electromotive force which then causes a current to pass from the contact 11c through the galvanometer winding in a reverse direction to that previously considered and result in the contact 12a engaging the fixed contact 12c. This closes a circuit from the line B through the switch 12e, contacts 12a and 12c and through the relay winding 14 to the line A. This excitation of the winding 14 causes its movable contacts to engage their respective fixed contacts and starts the motor 16 in the reverse direction to that previously considered by a circuit from the line A through the armature 16, contact 14d, contact 14c, and then through the reversing winding 16a to the line B. This starts the motor 16 in the reverse direction to that previously considered and turns the valve 18 to increase the temperature within the enclosure 1. A lamp bulb 31 is connected across the terminals of the armature 16 by a circuit from the line A to a connection between the field winding 16a and the armature. This lamp bulb may be green to indicate that the motor is operating to increase the temperature within the enclosure 1. At the same time the motor 16 is started, the motor 19 is also started by a connection from the line B through the contacts 14a and 14b of the relay 14 and then to the line A. The starting of the motor 19 results in the same cycle of operations of the timer as already described, causing the excitation of the reset winding 28 of the galvanometer, then its deenergization and then the automatic stopping of the motor 19. If, however, the time interval of operation of the motor 16 has not been long enough to restore the temperature within the enclosure 1 to normal, the movable contact of the galvanometer will engage its fixed contact 12c to cause a repetition of the cycle of operations until the normal temperature has been restored.

Throughout the operations of the apparatus the milliammeter MA gives a continuous reading of the temperature within the enclosure 1 because its thermo-couple is of the same character and in its relative location and subject to the same temperature changes as the controlling thermocouple.

If for any reason it is desired to manually control the operation of the valve 18 to increase or decrease the temperature within the enclosure 1, this may be accomplished by depressing the lever 15 on one side or the other. In each of the depressed positions of the lever 15, the movable element of the switch 12e is disengaged from its fixed contacts and thereby opens the circuit controlled by the galvanometer 12 and prevents any automatic control when the manual control is utilized. When the contact 15a is depressed to engage the contacts 15b and 15c, the circuit of the motor 16 is closed by a circuit from the line A through the armature 16, contacts 15c, 15a and 15b through the field winding 16b to the line B. This starts the motor in a direction to decrease the temperature within the enclosure 1. It also closes the circuit of the lamp bulb 27 from the line A to the connection between the armature 16 and the field winding 16b. When the lever 15 is depressed in a direction to cause the contact 15d to engage the fixed contacts 15e and 15f, the motor will be started in a direction to increase the temperature within the enclosure 1 by a circuit from the line A through the motor armature 16, contacts 15e, 15d and 15f and then through the reverse field winding 16a to the line B. The lamp bulb 31 will then receive current to show that the motor is operating in a direction to increase the temperature within the enclosure 1 by a circuit from the line A to a connection between the field winding 16a and the motor armature 16.

The temperature which is desired to be maintained approximately constant within the enclosure may be adjusted to a desired value by means of the variable resistors 11a and 11b.

A millivoltmeter MV may be connected across the terminal connections of the couple 4, 5 and have its scale graduated in degrees for indicating the temperature within the enclosure 1. One terminal of the voltmeter is shown connected to the wire 5 of the couple and the other terminal to a contact 29. When the switch 30 is moved to open the connection to the galvanometer coil and to engage the contact 29, the voltmeter will be connected independently to the couple 4, 5. When the millivoltmeter is utilized, the milliammeter and its couple may sometimes be dispensed with.

In Fig. 2 the timer which controls the excitation of the reset coil 28 of the galvanometer, is operated continuously instead of being subject to control by the relays 13 and 14 as in Fig. 1. In Fig. 2 the parts corresponding to those of Fig. 1 are designated by corresponding reference characters, but the motor 19 is connected directly across the lines A and B. The continuous operation of the motor 19 results in intermittently energizing the reset coil 28 and allows the automatic control of the temperature to function when necessary to restore the temperature to normal during the periods when the reset coil is not energized.

Single thermo-couples have been disclosed in the drawing for simplicity, but it will be understood that a number of pairs of dissimilar metals may be connected in series for increasing the electromotive force thereof, the alternate junctions of the couples being exposed within the enclosure 1 while the intermediate junctions are maintained at a lower uniform temperature on the support 7. In order to obtain close regulation of the temperature within the enclosure 1, the cold junctions of the thermo-couples at the support 7 should be maintained at a constant temperature by a suitable means and this also applies to the indicating instruments MV and MA and to the galvanometer 12 and to the resistive devices 11, 11a and 11b. This may best be accomplished by mounting the instruments, the support 7 and the resistors with their adjustable means within the same instrument case and kept at a constant temperature.

In his particular disclosure, the enclosure 1 has been described as being heated to a constant temperature, but the invention is likewise applicable to cooling the enclosure 1, or a bath or other medium.

Although one embodiment of the invention has been disclosed, it will be understood that various modifications thereof may be made for adaptation to particular requirements without departing from the scope of the invention.

I claim:

Temperature controlling apparatus comprising an enclosure in which the temperature is to be controlled, a thermo-electric couple having its heated junction within said enclosure, means for deriving an electromotive force of approximately constant value, a responsive device connected in a circuit in which the electromotive force of said couple is opposed to said derived electromotive force, said responsive device having a movable contact and fixed contacts respectively engaged by said movable contact, means controlled by said responsive device for affecting the temperature within said enclosure when said movable contact engages either of said fixed contacts, an electromagnetic device for moving said movable contact to a disengaged position when energized, a switch in the circuit of said electromagnetic device for energizing said electromagnetic device when the switch is closed, a timing device having a shaft and cam for closing said switch for short time intervals, and an electric motor for driving said shaft, said shaft also having a cam and circuit connection controlled thereby for insuring the opening of said switch when said movable contact is out of engagement with said fixed contacts.

WALTER J. WILLENBORG.

REFERENCES CITED

The following references are of record in the file of this patent:

UNITED STATES PATENTS

| Number | Name | Date |
|---|---|---|
| 1,841,559 | Uehling | Jan. 19, 1932 |
| 2,039,526 | Fennell et al. | May 5, 1936 |
| 2,106,262 | Wilhjelm | Jan. 25, 1938 |
| 2,121,601 | Kovalsky | June 21, 1938 |
| 2,140,363 | Kovalsky | Dec. 13, 1938 |
| 2,212,760 | Uehling | Aug. 27, 1940 |
| 2,294,775 | Edwards et al. | Sept. 1, 1942 |
| 2,326,465 | Keeler | Aug. 10, 1943 |
| 2,441,632 | Holst | May 18, 1948 |

OTHER REFERENCES

Handbook of Industrial Temperature and Humidity Measurement and Control, Behar, Pittsburgh, 1932, page 153.